US012384652B2

(12) United States Patent
Kattainen et al.

(10) Patent No.: US 12,384,652 B2
(45) Date of Patent: Aug. 12, 2025

(54) REMOTE OPERATION OF AN ELEVATOR

(71) Applicant: Kone Corporation, Helsinki (FI)

(72) Inventors: Ari Kattainen, Helsinki (FI); Juha-Matti Aitamurto, Helsinki (FI)

(73) Assignee: Kone Corporation, Helsinki (FI)

( * ) Notice: Subject to any disclaimer, the term of this patent is extended or adjusted under 35 U.S.C. 154(b) by 1301 days.

(21) Appl. No.: 17/100,202

(22) Filed: Nov. 20, 2020

(65) Prior Publication Data

US 2021/0171315 A1 Jun. 10, 2021

(30) Foreign Application Priority Data

Dec. 10, 2019 (EP) .................................... 19214831

(51) Int. Cl.
*B66B 1/34* (2006.01)
*B66B 1/28* (2006.01)
(Continued)

(52) U.S. Cl.
CPC .................. *B66B 1/28* (2013.01); *B66B 1/30* (2013.01); *B66B 1/32* (2013.01); *B66B 1/3461* (2013.01);
(Continued)

(58) Field of Classification Search
CPC .... B66B 1/28; B66B 1/30; B66B 1/32; B66B 1/3461; B66B 3/002; B66B 5/0025
(Continued)

(56) References Cited

U.S. PATENT DOCUMENTS 5,736,694 A * 4/1998 Ketoviita .............. B66B 5/0025 187/247
6,364,066 B1 4/2002 Bolch et al.
2019/0158353 A1* 5/2019 Johnson .............. H04L 63/0823

FOREIGN PATENT DOCUMENTS

CN 1558863 A 12/2004
CN 101287667 A 10/2008
(Continued)

OTHER PUBLICATIONS

European Search Report for European Patent Application No. 19214831.0 dated Jun. 23, 2020.
(Continued)

*Primary Examiner* — Erick D Glass
(74) *Attorney, Agent, or Firm* — Harness, Dickey & Pierce, P.L.C.

(57) ABSTRACT

According to an aspect, there is provided a method for remote operation of a plurality of elevators in a centralized manner by a remote service system, the remote service system comprising a remote communication computer and wherein each of the plurality of elevators comprises an elevator controller associated with a communication computer. The method comprises receiving, by a remote service system from the communication computer associated with an elevator, a rescue request associated with the elevator; providing, by the remote service system, a verification to distinguish the elevator associated with the rescue request among the plurality of elevators; enabling, by the remote communication computer, a data connection with the communication computer associated with the elevator to control the verified elevator; and performing, by the remote service system, at least one remote operation associated with the verified elevator using the enabled data connection.

18 Claims, 2 Drawing Sheets

(51) Int. Cl.

| | |
|---|---|
| ***B66B 1/30*** | (2006.01) |
| ***B66B 1/32*** | (2006.01) |
| ***B66B 3/00*** | (2006.01) |
| ***B66B 5/00*** | (2006.01) |
| ***G08B 3/00*** | (2006.01) |
| ***G08B 5/22*** | (2006.01) |

(52) U.S. Cl.
CPC ............ *B66B 3/002* (2013.01); *B66B 5/0025* (2013.01); *G08B 3/00* (2013.01); *G08B 5/22* (2013.01)

(58) Field of Classification Search
USPC .......................................................... 187/247
See application file for complete search history.

(56) References Cited

FOREIGN PATENT DOCUMENTS

| | | | |
|---|---|---|---|
| CN | 102368345 | A | 3/2012 |
| CN | 106586759 | A | 4/2017 |
| CN | 110015601 | A | 7/2019 |
| CN | 110035969 | A | 7/2019 |
| CN | 110271926 | A | 9/2019 |
| CN | 110475737 | A | 11/2019 |
| EP | 3511280 | A1 | 7/2019 |
| EP | 3539913 | A1 | 9/2019 |
| JP | 2019-182601 | A | 10/2019 |

OTHER PUBLICATIONS

Office Action issued on Mar. 22, 2024 in its corresponding Chinese Application No. 202011283802.X.

* cited by examiner

REMOTE OPERATION OF AN ELEVATOR

RELATED APPLICATIONS

This application claims priority to European Patent Application No. EP19214831.0 filed on Dec. 10, 2019, the entire contents of which are incorporated herein by reference.

TECHNICAL FIELD

The disclosure relates to elevator systems, and more particularly to a method and a remote operator system for remote operation of an elevator.

BACKGROUND

In some operational situations, elevators may need to be operated manually. For example, an elevator car may stop between two landings due to a malfunction and passengers get trapped inside the elevator car. Usually a manual rescue operation is needed. The rescue operations may require, for example, manual opening of hoisting machinery brakes and manual emergency drive.

The manual elevator operation is traditionally performed locally at an elevator site. This means that it can take some time before a serviceman arrives at the elevator site and rescues the trapped passengers from the elevator car.

It would be beneficial to have a solution which would facilitate a rescue operation of trapped passengers.

SUMMARY

It is an objective to provide a method for remote operation of a plurality of elevators. The objective is achieved by the features of the independent claims. Some embodiments are described in the dependent claims.

According to a first aspect, there is provided a method for remote operation of a plurality of elevators in a centralized manner by a remote service system, the remote service system comprising a remote communication computer associated and wherein each of the plurality of elevators comprises an elevator controller associated with a communication computer. The method comprises receiving, by the remote service system from the communication computer associated with an elevator, a rescue request associated with the elevator; providing, by the remote service system, a verification to distinguish the elevator associated with the rescue request among the plurality of elevators; enabling, by the remote communication computer, a data connection with the communication computer associated with the elevator to control the verified elevator; and performing, by the remote service system, at least one remote operation associated with the verified elevator using the enabled data connection.

According to a preferred embodiment, a verification to distinguish the elevator associated with the rescue request among the plurality of elevators is a verification to identify the elevator associated with the rescue request among the plurality of elevators.

In an example embodiment, providing, by the remote service system, a verification to distinguish the elevator associated with the rescue request among the plurality of elevators comprises establishing the verification by means of a shared secret.

In an example embodiment, in addition or alternatively, the shared secret comprises a challenge-response authentication.

In an example embodiment, in addition or alternatively, providing, by the remote service system, a verification to distinguish the elevator associated with the rescue request among the plurality of elevators, comprises causing generation, by the remote service system, of the challenge as a visual and/or an audible signal within the elevator; and determining, by the remote service system, based on the visual and/or audible signal that the visual and/or audible signal originates from the elevator associated with the rescue request.

In an example embodiment, providing, by the remote service system, a verification to distinguish the elevator associated with the rescue request among the plurality of elevators, comprises obtaining at least one image comprising a visually identifiable element from an interior of at least one elevator; and verifying the elevator associated with the rescue request based on at least the visually identifiable element from the interior of the at least one elevator.

In an example embodiment, in addition or alternatively, the rescue request comprises an identifier identifying a physical element associated with the elevator, and providing, by the remote service system, a verification to distinguish the elevator associated with the rescue request among the plurality of elevators, comprises checking, from a memory, that the identifier is associated with the elevator subject to the rescue request.

In an example embodiment, in addition or alternatively, the at least one remote operation comprises bypassing of a safety contact.

In an example embodiment, in addition or alternatively, the at least one remote operation comprises bypassing of a safety function. The bypassing of a safety contact or bypassing of a safety function may be performed by means of a safety software or a safety software layer of a computer.

In an example embodiment, in addition or alternatively, the at least one remote operation comprises opening of at least one hoisting machinery brake.

In an example embodiment, in addition or alternatively, the at least one remote operation comprises activating of a rescue drive unit associated with the elevator.

In an example embodiment, in addition or alternatively, the remote communication computer comprises a safety layer, and the safety layer of the remote communication computer is configured to establish a black channel with a safety layer of a rescue apparatus associated with the elevator. The safety layer may refer to software designed to fulfill a safety integrity level, preferably the safety integrity level 3, in accordance with IEC 61508 standard.

According to a second aspect, there is provided a remote service system for performing remote operation of a plurality of elevators in a centralized manner by a remote service system. The remote service system comprises a remote communication computer; means for receiving from the communication computer associated with an elevator, a rescue request associated with the elevator; means for providing a verification to distinguish the elevator associated with the rescue request among the plurality of elevators; means for enabling by the communication computer a data connection with the communication computer associated with the elevator to control the verified elevator; and means for performing at least one remote operation associated with the verified elevator using the enabled data connection.

In an example embodiment, the means for providing a verification to distinguish the elevator associated with the rescue request among the plurality of elevators are configured to establish the verification by means of a shared secret.

In an example embodiment, in addition or alternatively, the shared secret comprises a challenge-response authentication.

In an example embodiment, in addition or alternatively, the means for providing a verification to distinguish the elevator associated with the rescue request among the plurality of elevators are configured to cause generation, by the remote service system, of the challenge as a visual and/or an audible signal within the elevator; and determine based on the visual and/or audible signal that the visual and/or audible signal originates from the elevator associated with the rescue request.

In an example embodiment, in addition or alternatively, the means for providing a verification to distinguish the elevator associated with the rescue request among the plurality of elevators are configured to obtain at least one image comprising a visually identifiable element from an interior of at least one elevator; and verify the elevator associated with the rescue request based on at least the visually identifiable element from the interior of the at least one elevator.

In an example embodiment, in addition or alternatively, the rescue request comprises an identifier identifying a physical element associated with the elevator, and the means for providing a verification to distinguish the elevator associated with the rescue request among the plurality of elevators are configured to check, from a memory, that the identifier is associated with the elevator subject to the rescue request.

In an example embodiment, in addition or alternatively, the at least one remote operation comprises bypassing of a safety contact.

In an example embodiment, in addition or alternatively, the at least one remote operation comprises bypassing of a safety function.

In an example embodiment, in addition or alternatively, the at least one remote operation comprises opening of at least one hoisting machinery brake.

In an example embodiment, in addition or alternatively, the at least one remote operation comprises activating of a rescue drive unit associated with the elevator.

In an example embodiment, in addition or alternatively, the remote communication computer comprises a safety layer, and the safety layer of the remote communication computer is configured to establish a black channel with a safety layer of a rescue apparatus associated with the elevator.

According to a third aspect, there is provided an elevator system comprising a remote service system of the second aspect, and a plurality of elevators comprising an elevator controller associated with a communication computer.

According to a fourth aspect, there is provided a computer program comprising a computer code which, when executed by at least one processor, causes the at least one processor to perform the method of the first aspect.

According to a fifth aspect, there is provided a computer readable medium comprising a computer program comprising a computer code which, when executed by at least one processor, causes the at least one processor to perform the method of the first aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

According to the solution presented in the description below, an elevator which has sent a rescue request may be operated remotely from a remote service system after verifying the elevator subject to the rescue request from a plurality of elevators. The elevator may send the rescue request, for example, in response to a detected malfunction of the elevator, or only if the detected malfunction fulfils a preset criteria. The elevator may be operated by an automated process from the remote operation system after a need for the remote operation is detected. The plurality of elevators may locate in different geographical locations than the remote operation system. The solution is advantageous because rescuing passengers from an elevator car may be performed in a centralized manner without any delays, for example, due to waiting for an arrival of a serviceman. The solution may also provide a safe way to perform remote rescue operations, as the correct elevator may be verified securely. Further, the solution may achieve cost savings and streamlining of the rescue process as the need for a serviceman to the elevator site is obviated.

Figure 1:
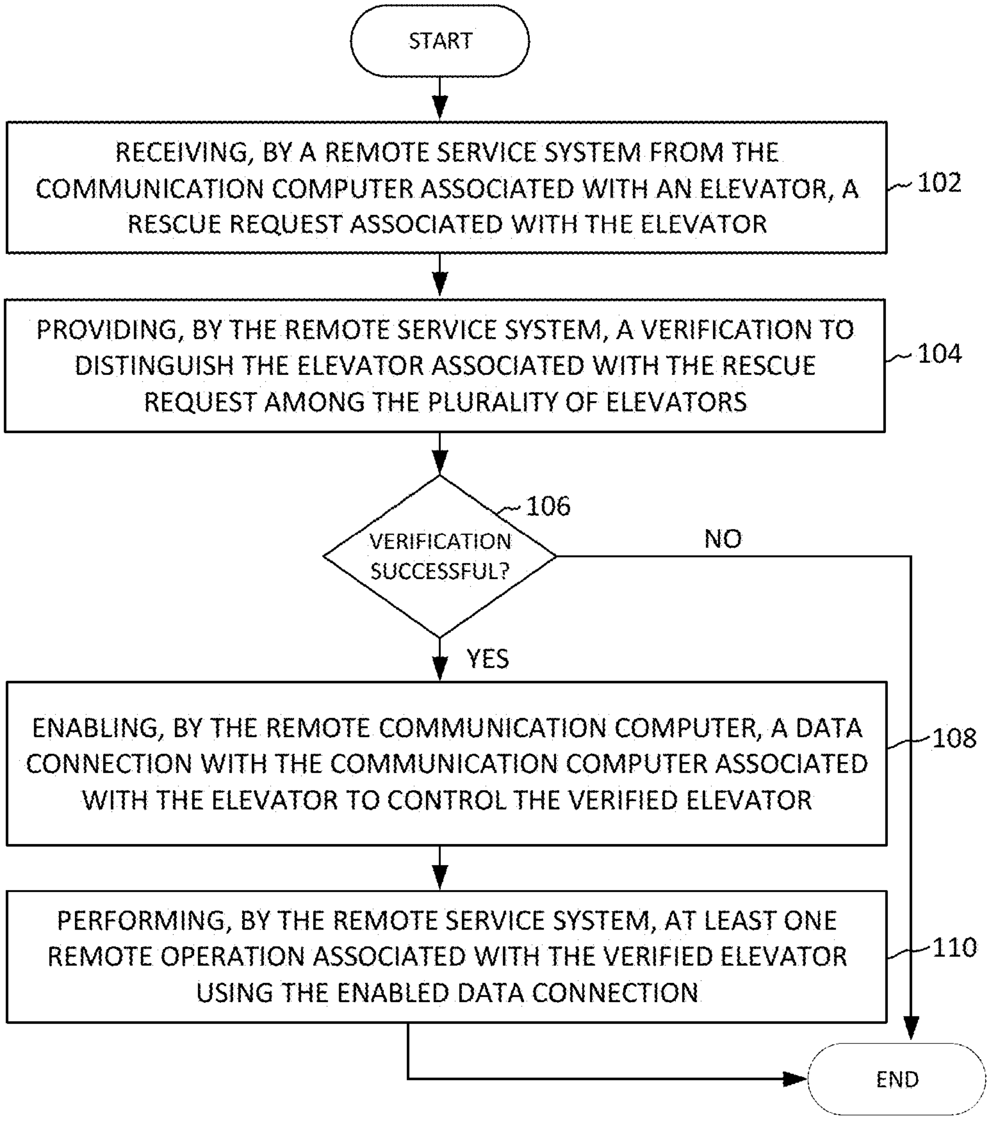
FIG. 1 illustrates a schematic flow chart of a method for remote operation an elevator of a plurality of elevators from a remote service system according to an example embodiment.

FIG. 1 illustrates a schematic flow chart of a method for remote operation of an elevator of a plurality of elevators according to an example embodiment.

Each of the plurality of elevators may comprise an elevator controller coupled to a communication computer of the elevator. Alternatively or in addition, some or all of the elevator controllers may be coupled to a shared communication computer. Alternatively or in addition, the communication computer may be integrated into an elevator control unit. Alternatively or in addition, the communication computer may be integrated into an electronic safety controller of an elevator.

A remote service system may comprise a communication computer to communicate with the communication computer(s) associated with the elevator(s). The remote operation may be performed from the remote service system via a communication network, for example, via an internet connection. Therefore, the communication computers may be configured to enable or establish a data connection via internet.

An operation anomaly of an elevator among a plurality of elevators may be detected by an elevator controller associated with the elevator. The elevator controller may process the operation anomaly and determine if a rescue request need to be sent. In an example embodiment, the detected operation anomaly may be compared to a preset criterion or criteria. The elevator controller may be configured to generate the rescue request, for example, if there are passengers inside the elevator car and the anomaly prevents them from leaving the elevator. As an example, the elevator may have stopped between landings due to a power interruption or an opening of an elevator safety chain. The elevator controller may further check if the state of an elevator safety system allows a remote emergency rescue operation.

In an example embodiment, the rescue request may be generated only if the operation anomaly fulfils the preset criterion or criteria. By applying the preset criterion or criteria, unnecessary rescue requests may be avoided, for example, in cases where remote operation is not possible or needed at that particular moment. Alternatively, the rescue request may be generated in response to any operation anomaly. After the elevator controller has generated the rescue request, the rescue request may be sent by the communication computer associated with the elevator to the remote service system.

At 102, the rescue request associated with the elevator is received by the remote service system from the communication computer associated with an elevator. The rescue request may be received by the communication computer of the remote service system.

At 104, the remote service center system provides a verification to distinguish, in particular to identify, the elevator associated with the rescue request among the plurality of elevators. The purpose of the verification is to ensure that a correct elevator will be subject to the remote operation. For example, in response to the received rescue request, the remote service system may be configured to perform a remote check to verify the correct elevator which sent the request. In case the remote check is not successful (at 106), the remote operation may not be performed.

In an example embodiment, the verification process may be automated. For example, the remote service system may comprise a memory or have an access to a remote memory comprising identities of elevator components or elements and in which elevator each component or element is installed to. The rescue request may comprise an authentication message to the remote service system. Alternatively, the communication computer may send the authentication message to the remote service system separately from the rescue request. The authentication message may comprise a secret key stored, for example, in a chip, an element or a device installed in the elevator and/or an identification number of the chip, element or device. The remote service system may verify the correct elevator by checking from the memory in which elevator the chip, element or device is installed. In other words, when the remote service system receives a message from the communication comprising a secret key associated with the elevator or an identity of a component in the elevator, the remote service system is able to verify that the rescue request originates from a specific elevator. The checking of the secret key or identification information may be made automatically, for example, by appropriate software configured in the remote service system, or by an operator at the remote service system.

In an example embodiment, the verification may be performed, for example, by means of a shared secret or by means of a challenge-response authentication. The method for the challenge-response authentication may comprise generating the challenge by means of a remote manual operation panel of the remote service system or automatically by the remote service system. The remote service system may cause generation of a visual or audible signal within the elevator. The remote service system may then determine based on the visual and/or audible signal that the visual and/or audible signal originates from the elevator associated with the rescue request. For example, the remote service system may instruct the communication computer associated with the elevator to cause generation of the visual and/or audible signal. As the remote service system may receive data from the plurality of elevators, for example, surveillance feeds, the remote service system is able to determine which of the elevator provides the challenge and response, i.e. the visual and/or audible signal.

The remote service center may comprise input means and a monitor. The monitor may provide an image feed or feeds associated with an interior of an elevator and/or exterior of the elevator. The input means may comprise any component or system configured for receiving an input from a human, such as one or more physical or virtual buttons, a keyboard, voice command receiving means etc. As an example, an operator of the remote service system may press a button at the remote service system to turn on a light and/or a buzzer in the elevator site. The elevator site may refer to the interior of the elevator car, spaces below and above the elevator car, elevator shaft, and other areas associated to the elevator or an elevator group that can be monitored by the remote service system. As an example, lights of at least one call button inside the elevator car may be turned on or caused to blink. As another embodiment, a visual element in a car operating panel (COP) may be switched on. The operator may alternatively control interior lights of the elevator car or speak through a speaker located in the elevator car or cause an audible signal to be generated by the car operating panel. The response may then acknowledged with suitable means, for example, with a camera when the response is a visual signal or with a microphone when the response is an audible signal. As an example, the operator of the remote service system may verify from a received camera image or audible signals that the correct elevator has been selected from the plurality of elevators to perform the remote operation. Instead of requiring the operator actions in the verification procedure, in another example embodiment, the needed actions may be performed automatically by the remote service system.

In an example embodiment, the remote service system does not need to separately cause generation of a visual and/or audible signal in the elevator. The remote service system may use a camera image (for example, from a surveillance camera feed) from the elevator to identity a visual code, for example, a QR code, or a serial number located in the elevator car. The remote service system may store data or have access to data that comprises correspondence between elevators and visual codes. Based on this information, the remote service system is then able to verify that the correct elevator has been selected from the plurality of elevators to perform the remote operation.

In an example embodiment, integrity may be ensured by encapsulating all safety-critical rescue data sent from the elevator site to the remote service system, such as monitoring data, to a datagram with a verified address of the sender. The address may be verified, for example, by a separate address database that records addresses of the plurality of elevators. The address may also be a physical address of the particular elevator associated element, such as a medium access control (MAC) address of a device subject to the remote operation. The verified address may be also used to identify the correct elevator.

If the verification was successful at 106, the operation may proceed to 108. At 108, a data connection with the communication computer associated with the elevator is established by the remote communication computer of the remote service system to control the verified elevator. Then at 110, at least one remote operation associated with the verified elevator is performed by the remote service system using the established data connection. The at least one remote operation may be performed automatically by the remote service system.

Each elevator may comprise a rescue apparatus. The rescue apparatus may be subject to the remote operation. The rescue apparatus may comprise, for example, a camera, a rescue controller, one or more safety contacts, a backup battery drive, an electrical brake opening device, etc.

As an example of the remote operation, the remote service system may perform a remote bypass of a safety contact or a safety function to enable a rescue drive. To enable the rescue drive, the remote service system may, for example, bypass safe brake circuit/safe torque off functions, or bypass one or more elevator safety contacts. Thereafter, the remote service system may perform the rescue drive. The rescue drive may mean that safety brakes are opened such that the elevator car can move by means of gravity. Alternatively, the rescue drive may mean that the safety brakes are opened and power is supplied to a hoisting motor as long as drive buttons of the remote operation panel are pushed. As another example, the remote operation may comprise activation of a rescue drive unit or opening of hoisting machinery brake or brakes.

In an example embodiment, the remote operations may performed without human involvement. For example, the remote service system may be configured to automatically verify the correct elevator based on an address or component identity information as described earlier. Further, the remote service system may be configured to perform the at least one remote rescue operation after a successful verification.

In an example embodiment, a secure connection between the remote service system and the plurality of elevators may be ensured by means of a black channel principle. Further, each communication computer may be provided with a safety layer. The safety layer may refer to specific software that has been designed to fulfil target safety integrity level. For example, the safety layer may refer to software designed to fulfill a safety integrity level, preferably the safety integrity level 3, in accordance with the IEC 61508 standard. For example, each communication computer may have a normal software layer and an additional safety software layer. Similarly, the communication computer of the remote service system may have a corresponding safety layer. Further, rescue apparatuses, for example, a camera, a rescue controller, a safety contact, a backup battery drive, an electrical brake opening device etc.) of each elevator site may be associated with the safety layer of the communication computer associated with each respective elevator.

In an example embodiment, the elevator controller may send additional data of the operation anomaly to the remote service system. The additional data may be sent upon a request from the remote service system, or automatically. The additional data may comprise, for example, information to ensure that the remote operation may be performed safely.

Figure 2A:
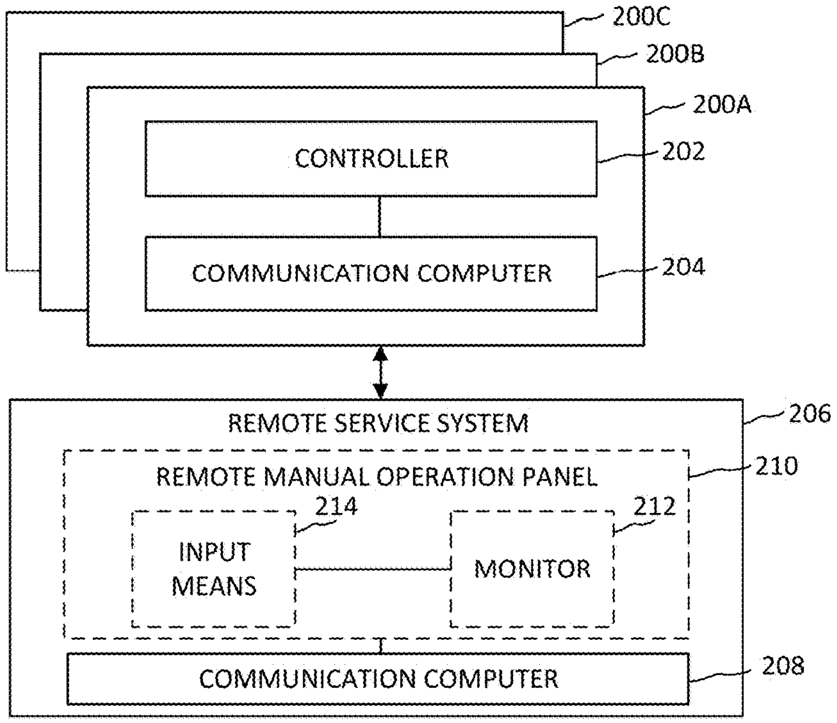
FIG. 2A illustrates a schematic block diagram of a system for remote operation of an elevator of a plurality of elevators from a remote service system according to an example embodiment.
Figure 2B:
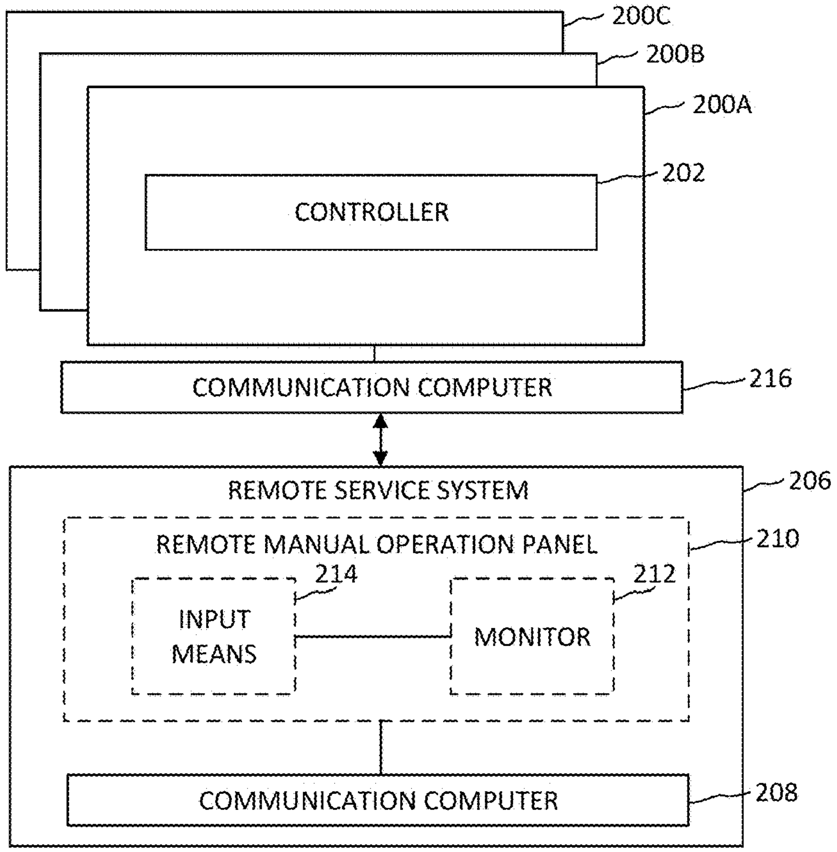
FIG. 2B illustrates a schematic block diagram of a system for remote operation of an elevator of a plurality of elevators from a remote service system according to another example embodiment.

FIGS. 2A and 2B illustrate a schematic block diagram of a system for remote operation of an elevator of a plurality of elevators 200A, 200B, 200C from a remote service system 206 according to an example embodiment. The illustrated solution may enable remote operation of the plurality of elevators 200A, 200B, 200C located in different geographical locations from one remote service system 206 in a centralized manner.

In FIG. 2A, each elevator 200A, 200B, 200C of the plurality of elevators 200A, 200B, 200C comprises an elevator controller 202 associated with a communication computer 204. Each elevator 200A, 200B, 200C may comprise a dedicated communication computer 204 or some or all of the elevators 200A, 200B, 200C may share the communication computer 216, as illustrated in FIG. 2B. The communication computer 216 may be, for example, a common communication computer for a group of elevators 200A, 200B, 200C located in the same elevator site. The illustrated solution further comprises the remote service center 206. The remote service system 206 comprises means for receiving from the communication computer associated with an elevator, a rescue request associated with the elevator, means for providing a verification to distinguish the elevator associated with the rescue request among the plurality of elevators, means for enabling by the remote communication computer a data connection with the communication computer associated with the elevator to control the verified elevator, and means for performing at least one remote operation associated with the verified elevator using the enabled data connection.

In an example embodiment, the remote service system 206 may comprise a remote operation panel 210 coupled with a communication computer 208 of the remote service system 206. The remote operation panel 210 may comprise input means 214 and a monitor 212. The input means 214 may comprise, for example, a keyboard, a mouse, virtual or physical buttons, or any other input component or device suitable for receiving an input from an operator of the remote service system 206. The operator may observe data received from one or more elevators 200A, 200B, 200C with the monitor 212 and monitor progress of a remote operation of an elevator. The monitor 212 may comprise, for example, a screen and/or a speaker.

In an example embodiment, the remote operation or operations performed by the remote service system 206 may be automated and the remote service system 206 may be implemented without the remote manual operation panel 210. For example, the remote service system 206 may comprise at least one memory and at least one processor, the at least one memory comprising a computer program to automatically perform the operations associated with the remote service system 206. The computer program may comprise computer code instructions which, when executed by the at least one processor, causes the at least one processor to perform the necessary operations.

Each of the communication computers 204, 208, 216 may be configured to establish a data connection via a communication network, for example, the internet. A data connection between the communication computer 208 of the remote service system 206 and the communication computer 204, 216 associated with the elevators 200A, 200B, 200C may be enabled or established in response to providing, by the remote service system, a verification to distinguish, in particular to identify, the elevator associated with the rescue request among the plurality of elevators.

In an example embodiment, each of the elevators 200A, 200B, 200C may further comprise a monitoring device, such as a camera and/or a microphone (not shown in FIGS. 2A and 2B). The operator at the remote service system 206 may control, for example, a light and/or a buzzer from the remote manual operation panel 210. Also, the operator may receive, for example, a visual and/or an audio feed from the elevator 200A, 200B, 200C. Hence, the operator may verify that the data connection is enabled with the correct elevator 200A, 200B, 200C to which the rescue request related.

In an example embodiment, each of the communication computers 204, 208, 216 may comprise a safety layer to ensure a secure connection. The remote manual operation panel 210 may be associated with the safety layer of the communication computer 208 of the remote service system 206. One or more apparatuses of each elevator subject to remote operation may be associated with the safety layer of the communication computer 204, 216 associated with the corresponding elevator. The apparatus subject to the remote operation may comprise, for example, a rescue apparatus, a camera, a rescue controller, one or more safety contacts, a backup battery drive and an electrical brake opening device.

The means discussed in association with the remote service system 206 may be implemented at least partially or completely with the communication computer 208 of the remote service system, with at least one processor or with at least one processor coupled with at least one memory comprising instructions executable by the at least one processor.

By enabling remote operation(s) via the remote service system 206, time and cost savings may be enabled in situations where manual operations at the elevator site were required. Further, safety of the remote operation(s) is assured by verifying the correct elevator before performing the remote operation(s).

The exemplary embodiments and aspects of the invention can be included within any suitable device, for example, including, servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method of remotely operating a plurality of elevators in a centralized manner by a remote service system, the remote service system including a remote communication computer, the method comprising:

receiving, by the remote service system, a rescue request from a communication computer associated with an elevator among the plurality of elevators;

verifying, by the remote service system, the elevator as being associated with the rescue request by distinguishing the elevator from among the plurality of elevators;

enabling, by the remote communication computer, a data connection with the communication computer associated with the elevator, in response to verifying the elevator as being associated with the rescue request; and performing, by the remote service system, at least one remote operation associated with the elevator using the data connection.

2. The method of claim 1, wherein the verifying comprises:

utilizing a shared secret between the elevator and the remote communication computer to distinguish the elevator associated with the rescue request from among the plurality of elevators.

3. The method of claim 2, wherein the shared secret is utilized to distinguish the elevator associated with the rescue request from among the plurality of elevators through a challenge-response authentication.

4. The method of claim 3, further comprising:

generating, by the remote service system, a challenge by causing visual and/or an audible signal to be produced within the elevator; and distinguishing, by the remote service system, the elevator associated with the rescue request from among the plurality of elevators by observing that the visual and/or audible signal originates from the elevator.

5. The method of claim 1, wherein the verifying comprises:

obtaining at least one image of a visually identifiable element within an interior of the elevator; and distinguishing, by the remote service system, the elevator associated with the rescue request from among the plurality of elevators based on at least the visually identifiable element.

6. The method of claim 1, wherein the receiving the rescue request includes receiving an identifier identifying a physical element of the elevator associated with the rescue request; and the verifying includes determining whether the identifier corresponds to a trusted identifier.

7. The method of claim 1, wherein the performing the at least one remote operation comprises:

bypassing a safety contact associated with the elevator.

8. The method of claim 1, wherein the at least one remote operation comprises:

bypassing a safety function associated with the elevator.

9. The method of claim 1, wherein the performing the at least one remote operation comprises:

opening at least one hoisting machinery brake associated with the elevator.

10. The method of claim 1, wherein the performing the at least one remote operation comprises:

activating a rescue drive unit associated with the elevator.

11. The method of claim 1, wherein the enabling the data connection comprises:

establishing, by the remote communication computer, the data connection with the communication computer associated with the elevator using a black channel approach such that data associated with the at least one remote operation is associated with a safety layer and encapsulated into a datagram including the safety layer and a normal layer and transmitted via a non-safety specific network.

12. A remote service system configured to remotely operate a plurality of elevators in a centralized manner, the remote service system comprising:

a remote communication computer configured to, receive from a communication computer associated with an elevator among the plurality of elevators, a rescue request associated with the elevator, verify the elevator as being associated with the rescue request by distinguishing the elevator from among the plurality of elevators, enable a data connection with the communication computer associated with the elevator, in response to verifying the elevator as being associated with the rescue request, and performing at least one remote operation associated with the elevator using the data connection.

13. The remote service system of claim 12, wherein the remote communication computer is configured to, utilize a shared secret between the elevator and the remote communication computer to distinguish the elevator associated with the rescue request from among the plurality of elevators.

14. An elevator system comprising:

the remote service system of claim 12; and the plurality of elevators.

15. A non-transitory computer readable medium storing a computer program which, when executed by at least one processor, causes the at least one processor to perform the method of claim 1.

16. The method of claim 1, wherein the rescue request is transmitted to the remote service system upon the communication computer associated with the elevator determining that passengers are present inside the elevator and the elevator is stuck between two landings inhibiting the passengers from leaving the elevator.

17. The method of claim 16, wherein the performing the at least one remote operation includes transmitting an instruction via the data connection to the communication computer associated with the elevator that causes the communication computer to bypass safety equipment to move the elevator to a nearest one of the two landing, in response to verifying the elevator as being associated with the rescue request.

18. The method of claim 6, further comprising:

reading the trusted identifier from a memory.

* * * * *